United States Patent [19]
Eder

[11] 3,928,182
[45] Dec. 23, 1975

[54] METHOD AND APPARATUS FOR CLASSIFYING VISCOUS SLURRIES

[75] Inventor: Theodor Eder, Vienna, Austria

[73] Assignees: Waagner-Biro Aktiengesellschaft; Chemie und Metall GmbH Rheax, both of Vienna, Austria

[22] Filed: Sept. 30, 1974

[21] Appl. No.: 510,556

[30] Foreign Application Priority Data
Oct. 2, 1973   Austria ............................... 8397/73

[52] U.S. Cl. ....................... 209/12; 209/18; 241/24
[51] Int. Cl.² ............................................. B03B 7/00
[58] Field of Search ............... 209/18, 20, 3, 12, 13, 209/211, 155, 157–159, 461–464; 241/20, 241/24, 79, 80

[56] References Cited
UNITED STATES PATENTS

| | | | |
|---|---|---|---|
| 2,104,709 | 1/1938 | Weinig | 209/18 X |
| 2,668,667 | 2/1954 | Fern et al. | 241/24 |
| 2,790,551 | 4/1957 | Eder | 209/155 |
| 2,870,908 | 1/1959 | Fitch | 209/211 |
| 3,042,204 | 7/1962 | Eder | 209/157 |
| 3,071,249 | 1/1963 | Rains | 209/12 X |
| 3,452,866 | 7/1969 | Eder | 209/464 X |
| 3,502,271 | 3/1970 | Hays | 241/20 |
| 3,503,560 | 3/1970 | Condolios | 241/80 X |
| 3,813,851 | 6/1974 | Eder | 210/521 X |

*Primary Examiner*—Frank W. Lutter
*Assistant Examiner*—Ralph J. Hill
*Attorney, Agent, or Firm*—Steinberg & Blake

[57] ABSTRACT

A method and apparatus for classifying viscous slurries in order to sharply separate fine particles from coarse particles suspended therein. At a first classification stage fine particles are centrifugally separated from coarse particles by utilizing a liquid cyclone installation. The coarse particles derived from the first stage are delivered to a second stage where a gravitational wet classification is provided for separating coarse particles at the second stage by gravitational settling thereof with respect to the fine particles which overflow at the second stage. The slurry with fine particles therein separated at the second stage is delivered to a third stage where a further wet classification takes place to separate the fine particles derived from the second stage into coarse and fine particles at the third stage. The fine particles which are separated at the third stage are returned to the first stage while the coarse particles derived from the third stage are combined with at least part of the fine particles derived from the first stage to form the output of the system.

18 Claims, 5 Drawing Figures

METHOD AND APPARATUS FOR CLASSIFYING VISCOUS SLURRIES

BACKGROUND OF THE INVENTION

The present invention relates to methods and apparatus for wet classification of viscous slurries.

In particular, the present invention relates to a method and apparatus for sharply separating fine particles in viscous slurries while utilizing three or more wet-classification stages wherein the first stage, to which almost all of the slurry to be treated is fed, provides a centrifugal separation while the second stage, which receives all or most of the coarse material separated at the first stage, subjects material to a gravitational classification.

It has already been proposed to combine a pair of cyclone type of wet separators which are connected in series one after the other with a gravitational wet classifier which receives the coarse particles from the first or second liquid cyclone stage. The coarse particles gravitationally separated with the gravitational wet classifier while suspended in a slurry are delivered to a mill while the overflow suspension of the gravitational wet classifier is returned to the sump from which a pump delivers material to the liquid cyclone of the first stage. This type of system can only achieve classification with extremely low separation of solids, and the concentration of solids for the flotation process remains only in an average range of acceptability.

SUMMARY OF THE INVENTION

It is accordingly a primary object of the present invention to provide a method and apparatus which will greatly improve classification of particles suspended in relatively viscous slurries.

Thus, it is an object of the present invention to achieve from the method and apparatus thereof an output in the form of a slurry having therein a concentration of fine particles beyond what has heretofore been possible.

It is furthermore an object of the present invention to achieve such a highly concentrated output while utilizing far less water than was heretofore required.

Moreover, it is an object of the present invention to provide a method and apparatus capable of achieving an output wherein the fine particles are for the most part within a given size range.

One of the more specific objects of the present invention is to achieve an output wherein the slurry has eliminated therefrom fine particles which are smaller than a given size.

In order to be able to achieve the greatest possible concentration of fine particles with average granular separation, it is proposed in accordance with the present invention to subject the fine particles derived from a second wet classification stage at least for the most part to a third wet classification stage while returning the overflow with fine particles separated at the third stage back to the first wet classification stage and drawing off the coarse particles of the second wet classification stage. The fine particles of the entire system are composed particularly from fine particles derived from the first classification stage and from coarse particles derived from the third stage. In accordance with a further feature of the invention the concentration of extremely fine particles is reduced by subjecting the slurry with fine particles therein derived from the first wet classification stage to a fourth wet classification stage wherein a granular separation or classification is carried out to separate extremely fine particles of a size of between 5 and 40 microns (micrometers), while the coarse particles derived from this fourth stage are combined with the coarse particles resulting from the third stage to form the concentration of fine particles of the entire system.

With the apparatus of the invention the first wet classification stage includes one or more liquid cyclones to which the slurry is fed from a sump through a suitable pump, while at the second stage a gravitational type of wet classifier is utilized with a mechanical delivery of coarse particles from the gravitational classifier. This mechanical withdrawal of coarse particles from the gravitational classifier can be carried out particularly by a spiral or rake classifier. In the third classification stage as well as in the fourth classification stage, if a fourth stage is used, there are at least a liquid cyclone together with a pump and sump or a lamina thickener of the type shown, for example, in U.S. Pat. No. 3,813,851.

Thus, according to the present invention there are a combination of several classifications in order to achieve a suspension having the highest possible concentration with the least possible use of water, while at the same time the degree of sharpness of classification of the system of the invention is substantially improved as compared with previously known individual classification treatments.

The invention is to be utilized primarily in the preparation of ores. The comminuted product derived from milling is conventionally subjected to an assorting process by flotation so as to form a suspension, with the milling slurry achieving in general a concentration of over 25 percent solid particles and in some cases the latter concentration may be up to 45 percent. The required degree of classification will vary with the purity of the ore. In some cases the feed material will include in its suspension granular materials up to 10 percent of which have a size greater than 0.5 mm. In some cases, on the other hand, a very fine milling is achieved with only 10 percent of the particles having a size of over 60 microns.

BRIEF DESCRIPTION OF DRAWINGS

The invention is illustrated by way of example in the accompanying drawings which form part of the invention and in which.

DESCRIPTION OF PREFERRED EMBODIMENTS

Figure 1:
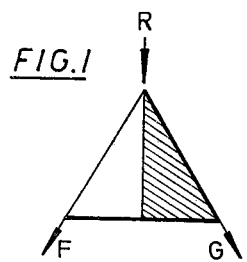
FIG. 1 shows a classification symbol used in FIGS. 2 and 3.

FIG. 1 illustrates a symbol which represents the granular separation, which in this case results from a wet classification. The top arrow R designates the supply of raw material. The lower right hand arrow G designates the slurry with coarse particles suspended therein, these particles generally sinking to become separated during wet classification from the fine particles. The arrow F illustrates the suspension of fine particles which are drawn off by separation from the sinking coarse particles. Thus in the illustrated triangle the left half shows the separation of fine particles drawn off as indicated by the arrow F, while the shaded right half designates the separation of coarse particles drawn off as indicated by the arrow G.

Figure 2:
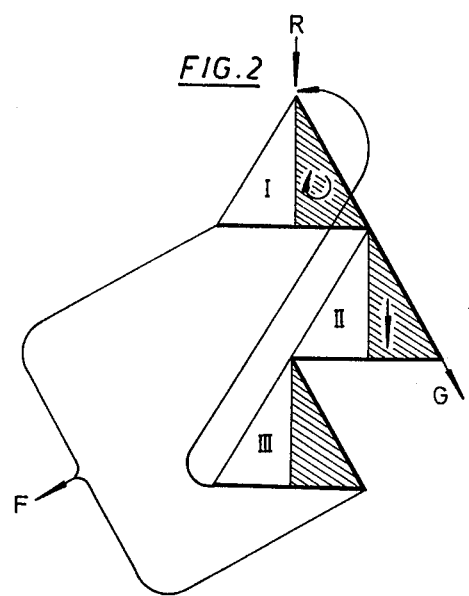
FIG. 2 is a schematic illustration of a wet classification method of the invention having three classification stages with FIG. 2 schematically illustrating the relationship between the three stages.

FIG. 2 schematically illustrates the combination of individual wet-classification treatments in accordance with the present invention. In the wet classification stage I the classification is carried out with centrifugal force utilizing a liquid cyclone, for example. In the wet classification stage II reliance is made only on gravitational forces for classification of the granular material.

However, at the wet classification stage III shown in Fig. 2, either centrifugal force or gravity are utilized for classification. The slurry with coarse particles derived from the first stage is delivered to the second stage. The slurry with fine particles at the second stage forms the feed for the third stage. The fine particles of the third stage are returned to the first stage. The coarse particles derived from the second stage are utilized primarily as the coarse particles for the entire system, while the fine particles of the entire system results from the combining of the fine particles resulting from classification at the first stage and coarse particles resulting from classification at the third stage. Thus, with the method schematically illustrated by the connections of FIG. 2, the coarse particles derived from the first liquid cyclone stage are fed to a gravitational wet classifier which mechanically handles the coarse particles while the overflow of this gravitation wet classifier is again thickened at the third stage while the thinned suspension derived from the third stage is returned to the sump from which a pump delivers material to the liquid cyclone of the first stage. The coarse particles derived from the thickener of the third stage is combined with the overflow from the liquid cyclone of the first stage to provide the slurry having the desired concentration of fine particles for the entire system.

Figure 3:
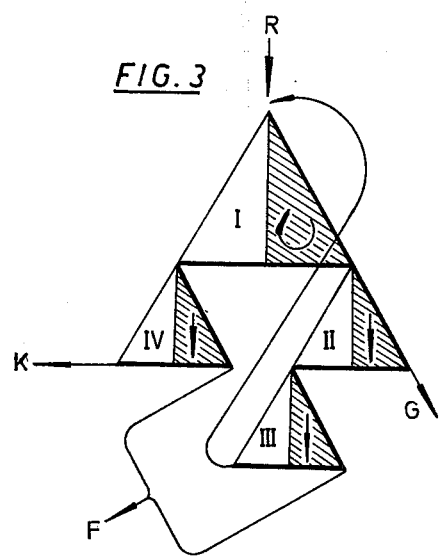
FIG. 3 is a schematic representation of a classification system of the invention utilizing four wet classification stages.

In order to increase the concentration of fine particles in the output of the system, according to the embodiment of FIG. 3 the overflow of the first stage is subjected with an extremely small degree of separation between fine and course particles to centrifugal force or gravity so as to have a further thickening with the overflow of this fourth stage IV being discarded as indicated by the arrow K. In the case where this discarded portion K consists primarily of extremely fine particles having a size of less than 15 microns, for example, this separation derived at the fourth stage reduces the loading of the flotation. The final product F containing fine particles is made up in the case of FIG. 3 from the coarse particles derived from the third stage III and the coarse particles derived from the fourth stage IV. In order to reduce the energy required, it is desirable to use for the third and fourth stages horizontal wet classifiers wherein the area where classification takes place is multiplied by incorporating inclined baffles into these classifiers.

Figure 4:
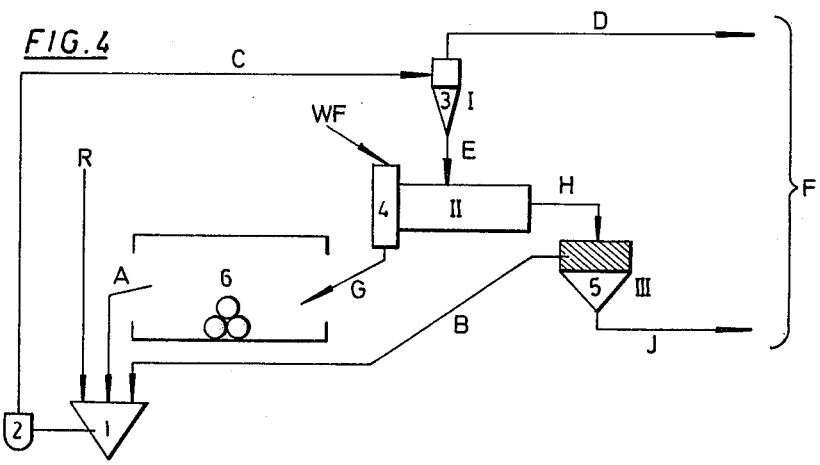
FIG. 4 is a schematic representation of an apparatus for carrying out the method illustrated schematically in FIG. 2.

FIG. 4 illustrates in detail the connections illustrated schematically in FIG. 2. The liquid level of a sump 1 which delivers slurry to the intake of the pump 2 is preferably controlled by a float which is controlled by a partial return of the overflow D from the liquid cyclone stage I to the sump 1. This small circuit of return flow from D shown at the upper right of FIG. 4 to the sump 1 shown at the lower left of FIG. 4 is not illustrated. The pump means 2 utilized for feeding the material to be treated takes the form of a rubberized centrifugal pump which supplies the slurry to one or more liquid cyclones of the first classification stage, these cyclones preferably being lined with rubber or plastic.

Inasmuch as the treatment with the liquid cyclone does not succeed in providing a separation of coarse particles which are almost entirely free of fine particles, it is possible to reduce the extent of fine particles which accompany the coarse particles by utilizing horizontal wet classifiers which remove the coarse particles mechanically as by utilizing, for example, spiral or rake classifiers. Coarse particles accompanied only by a trace of fine particles are achieved at the second stage by way of a multi-stage connection of a plurality of horizontal wet classifiers which are connected with each other in a phalanx type of connection (see U.S. Pat. No. 3,042,204, particularly FIGS. 2, 4, 6 and 8 thereof) according to which a header type of feed having at least one horizontal wet classifier will feed the slurry in parallel to a plurality of branches in each of which a number of wet classifiers are connected in series. The gravity type of wet classifier 4 illustrated schematically as forming stage 2 in FIG. 4 may take the form of a so-called Bathmos classifier, such as shown, for example, in U.S. Pat. No. 3,452,866, which utilize only a minimum of water and which are particularly suited for this second stage of the method of the present invention. Advantageously the primary amount of fresh water FW for the entire system is fed to this Bathmos classifier.

Inasmuch as the delivery of coarse particles from the Bathmos classifier 4 often contains a higher concentration of solids than can be effectively treated by the mill 6 to which the coarse particles are delivered from the stage II as indicated by the arrow G. in FIG. 4, a small amount of water will in some cases be mixed with the slurry which is fed in the manner indicated by the arrow G to the mill 6 just before this slurry reaches the mill 6 as it flows along the path G shown in FIG. 4.

In the third stage of the method of the invention it is also possible to use a liquid cyclone 5 together with a sump and a pump. However, in order to conserve energy it is advisable to use for the third stage a horizontal wet classifier such as, for example, a lamina thickener as disclosed in U.S. Pat. No. 3,813,851. By incorporating inclined baffles it is possible to substantially reduce the space and costs required for the apparatus. Thus, the overflow H from the Bathmos classifier 4 flows into the liquid cyclone 5 from which the overflow B is again returned to the sump 1 so that in this way, among other advantages, the load on the pump 2 is reduced. The concentrated coarse particles resulting from settling at the liquid cyclone 5 form the coarse particle output J thereof, and this output J is combined with the liquid cyclone overflow D of the first stage to provide the final product.

The separation or classification of granular material in the above III stages and the branching of the various slurries containing fine and coarse particles from the various stages as described above forms an essential step in the improvement of the classification while at the same time increasing the percentage of solids in the product F. The circuit of the invention can include the mill 6 which may be a ball mill or a rod bar mill or any other type of comminuting unit. In the milling circuit of FIG. 4 the raw material R is preferably fed directly into the sump 1 although it can also be delivered to the gravitation wet classifier 4 or to the mill 6.

Figure 5:
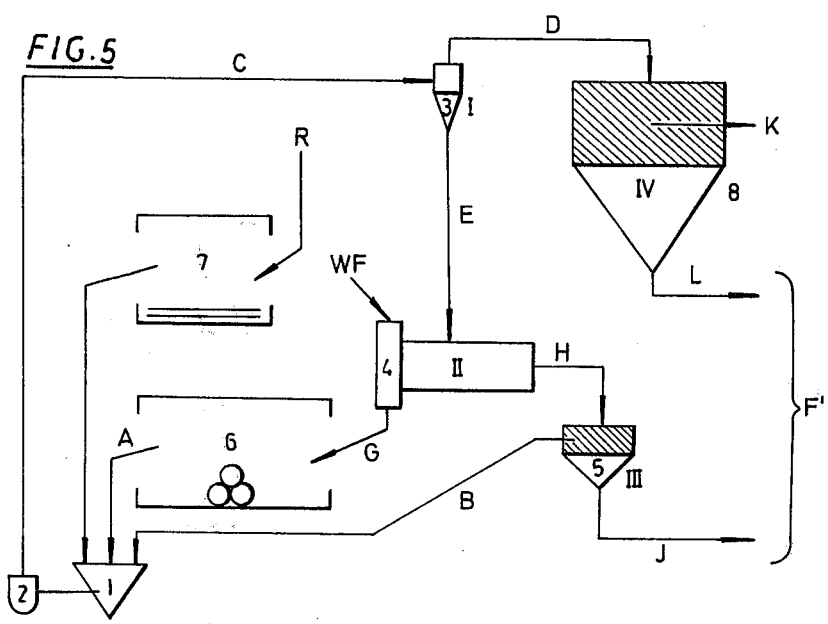
FIG. 5 is a schematic illustration of an apparatus for carrying out the method schematically illustrated in FIG. 3.

Referring to FIg. 5, it will be seen that the raw material R is fed to a rod mill 7. The thickening of the overflow D of the liquid cyclone 3 of the first stage can take place again in a liquid cyclone where in order to achieve an extremely small degree of granular classification several small cyclones must be used. For conservation of energy the operation at the fourth stage IV shown in FIG. 5 will, however, take place with a horizontal wet classifier whose sedimentation or settling output is multiplied for example by incorporation of a large number of inclined baffles. The overflow of this baffle type of thickener, indicated by the arrow K is separated from the floatation charge F' which forms the output of the system of FIG. 5 and which is made up of the slurry containing coarse particles settling at the classifier 8, as indicated by the arrow L, and coarse particles settling in the slurry derived from the classifier 5 and indicated by the arrow J in FIG. 5.

EXAMPLE I

UNITS COMBINED AS ILLUSTRATED IN FIG. 4

| | |
|---|---|
| Item 1 | A sump for the pump 2 having a liquid level controlled by a float, with the feed from the overflow of the liquid cyclone being controlled by the liquid level in the pump, Item 3 |
| Item 2 | Rubberized centrifugal pump. |
| Item 3 | Rubberized liquid cyclone with a diameter of 4 inches |
| Item 4 | 7-stage Bathmos wet classifier were constructed in accordance with Austrian Patent No. 253, 436, having 0.4 m² area of classification surface for each stage. |
| Item 5 | Baffle thickener according to Austrian Patent 303,071 having 0.4 m² area at its water surface with this separating area being multiplied tenfold by baffles so as to have an effective classification area of 4 m². |
| Item 6 | A ball mill having an interior volume of 1 m³, an interior diameter of 1 m. This mill is filled with 1700 kg iron balls each having a diameter of 60 mm. The mill is operated at 70% of its critical speed of rotation. |

RAW MATERIAL R

The raw material fed into the system was copper ore, having a specific weight of 2.7 g/cm³, a moisture content of 2.5 percent, and a size range of 0–6 mm, this raw material being fed to the sump 1 at a rate of 1900 kg/h.

After an operating time of six hours, the following reliable equilibrium conditions in the milling circuit were provided:

SOLID AND LIQUID CIRCUIT

| | |
|---|---|
| Item 1 Feed | Sump<br>1900 kg/h copper ore R<br>6200 kg/h mill output A having 70% solids<br>200 kg/h suspension in the overflow B of the baffle thickener 5. |
| Output C | In order to control the liquid level of the sump a small part of the overflow D of liquid cyclone 3 is returned to the sump 1 and controlled by a float. This small circuit is not shown in FIGS. 4 and 5 or taken into consideration in the liquid and solid circuit of the following tables. On the average the overflow of the liquid cyclone 3 was returned to the sump 1 at a rate having 400 kg/h solids with 1200 kg/h water, and in this way also an |

-continued
SOLID AND LIQUID CIRCUIT

| | |
|---|---|
| | advantageous dilution or thinning of the pumped material is achieved. |
| Item 3 | Hydrocyclone. Input pressure 0.6 atmosphere. |
| Overflow D | 800 kg/h, 25% solids as the first component of the final product. |
| Lower Discharge E | 7500 kg/h flow to the Bathmos classifier 4 (72% solids). |
| Item 4 | Mutli-stage gravity classifier (Bathmos). At the end where coarse particles are discharged 4000 l/h of fresh water is fed. (WS). |
| Settled Product G | 6200 kg/h, 73% solids, but before feeding to the mill this thick slurry was thinned with 350 l/h water to a concentration of 70% solids. |
| Overflow H | 1300 kg/h, 22% solids, flows into the baffle thickener 5. |
| Item 5 | Gravity thickener (baffle thickener). |
| Lower Discharge J | 1100 kg/h, 35.5% solids, as the second component of the final products. |
| Overflow B | 200 kg/h, 7% solids. |
| Final Product F | as the total of D and J<br>1900 kg/h, 30% solids, with 10% of the solids having a size greater than 250 microns and 35% having a size less than 40 microns. |

EXAMPLE II

The apparatus of Example I amplified by a larger baffle thickener forming Item 8, the liquid surface of which has an area of 1 m² which is intensified by the incorporated set of baffles to have an effective separating area of 10 m².

The liquid cyclone overflow D of Example I (800 kg/h) is fed to this larger baffle thickener where the overflow K (FIG. 5) is at the rate of 80 kg/h having a 5 percent solid content primarily of particles smaller than 15 microns since these extremely fine particles require an increase in the chemical requirements of the suspension during flotation with only a small contribution to the concentration of the output.

| | |
|---|---|
| Lower Discharge L | 720 kg/h, 41% solids as a component of final product F. |
| Final Product P | (total of J and L)<br>1820 kg/h, 38% solids with 10% of a size greater than 250 microns and 32% having a size smaller than 40 microns. |

COMPARISON WITH THE SAME COPPER ORE

With complete termination of the circuit the milling feed was throttled until the milled product reached approximately the degree of fineness of the final product of Example I (10 percent over 250 microns). With 69 percent solid content of the mill feed it was only at a reduced input of 700 kg/h that a product having solids of which 18 percent had a size greater than 250 microns was achieved.

Finally, the circuit was operated in a conventional manner with only one liquid cyclone. With 1550 kg/h feed the final product had solids wherein 13 percent had a size greater than 250 microns and 42 percent had a size smaller than 40 microns.

EXAMPLE 1

| | Raw Material R 0–6 mm | A | B | C | D |
|---|---|---|---|---|---|
| Solids kg/h | 1900 | 6200 | 200 | 8300 | 800 |
| Water l/h | 50 | 2650 | 2600 | 5300 | 2400 |
| + 0.25 mm % | 80 | 39 | 0 | 47.5 | 4 |
| 0.1–0.25 mm % | 8 | 40 | 2 | 32 | 16 |
| 0.04–0.1 mm % | 4 | 11 | 21 | 9.5 | 30 |
| 0–0.04 mm % | 8 | 10 | 77 | 11 | 50 |

| | E | F | G | H | J |
|---|---|---|---|---|---|
| Solids kg/h | 7500 | 1900 | 6200 | 1300 | 1100 |
| Water l/h | 2900 | 4400 | 2300 | 4600 | 2000 |
| + 0.25 mm % | 52 | 10 | 60 | 12 | 14 |
| 0.1–0.25 mm % | 35 | 22 | 36 | 23 | 27 |
| 0.04–0.1 mm % | 7 | 33 | 2 | 33 | 35 |
| 0–0.04 mm % | 6 | 35 | 2 | 32 | 24 |

F=D+J

EXAMPLE 2

| | K | L | F |
|---|---|---|---|
| Solids kg/h | 80 | 720 | 1820 |
| Water l/h | 1400 | 1000 | 3000 |
| + 0.25 mm % | 0 | 4.5 | 10 |
| 0.1–0.25 mm % | 0 | 18 | 23.5 |
| 0.04–0.1 mm % | 1 | 33 | 34.5 |
| 0–0.04 mm % | 99 | 44.5 | 32 |

F=J+L

What is claimed is:

1. In a method of operating a system for sharply classifying wet slurries for sharply separating fine particles from coarse particles in at least three stages, comprising the steps of delivery a slurry with particles which are to be classified suspended therein to a first stage, centrifugally separating fine particles from coarse particles in the slurry at the first stage, delivering the coarse particles separated at the first stage to a second stage, gravitationally separating coarse from fine particles at said second stage, delivering the fine particles in the slurry which are separated at the second stage to a third stage, separating fine from coarse particles at the third stage and returning the fine particles separated at the third stage back to the first stage, while providing for an output made up of the coarse particles derived in the slurry from the third stage and at least part of the fine particles centrifugally separated from the coarse particles at the first stage.

2. In a method as recited in claim 1 and including the steps of delivering slurry with centrifugally separated fine particles suspended therein and separated from coarse particles at the first stage to a fourth stage, separating fine from coarse particles at the fourth stage, and combining slurries having suspended therein coarse particles derived from the fourth stage and coarse particles derived from the third stage.

3. In a method as recited in claim 2 and wherein the slurry at the fourth stage is subjected to a wet classification which separates fine particles in a size range of from 5 to 40 microns from the remaining particles at the fourth stage which form the coarse particles thereof providing part of the output of the system.

4. In a method as recited in claim 1 and wherein a slurry having suspended therein fine particles centrifugally separated at the first stage is almost in its entirety combined with a slurry having suspended therein having coarse particles derived from the third stage to provide the output of the entire system.

5. In a method as recited in claim 1 and including the step of milling particles suspended in a slurry prior to delivery of the latter to said first stage for increasing the concentration of fine particles in the output of the system.

6. In a method as recited in claim 5 and wherein said milling is carried out at least in part on coarse particles derived from the second stage.

7. In an apparatus for treating viscous slurries to sharply separate fine particles from coarse particles suspended therein, liquid cyclone means forming a first wet classification stage for centrifugally separating fine particles from coarse particles, pump means communicating with said liquid cyclone means for delivering a slurry thereto, sump means communicating with said pump means for feeding a slurry thereto to be pumped thereby to said liquid cyclone means, gravitational wet classification means forming a second wet classification stage and communicating with said liquid cyclone means for receiving therefrom a slurry with coarse particles suspended therein, said gravitational classification means of said second stage gravitationally separating coarse particles from fine particles in the slurry received from said first stage, third wet classification means forming a third classification stage and communicating with said second stage for receiving therefrom a slurry with fine particles suspended therein, said third classification means separating fine from coarse particles in the slurry having suspended therein fine particles separated at said second stage, said third classification means communicating with said sump means for delivering thereto slurry with fine particles separated at said third stage, so that the latter slurry with the fine particles therein will be returned to the first stage, the slurry with coarse particles therein as derived from the third stage and at least part of the slurry with fine particles therein as derived from the first stage forming an output.

8. The combination of claim 7 and wherein a milling means communicates with said second stage and with said sump means for receiving gravitationally separated coarse particles from said second stage and reducing the size thereof before delivering the coarse particles from the second stage back to said sump means to be again returned as part of the input to said first stage.

9. The combination of claim 8 and wherein a spiral or rake classifier forms part of said gravitational wet classification means of said second stage for removing coarse particles therefrom for delivery to said milling means.

10. The combination of claim 8 wherein said milling means is a ball or rod mill.

11. The combination of claim 8 and wherein a supply means communicates with said sump means for delivering raw material thereto for delivery from said sump means by said pump means to said liquid cyclone means.

12. The combination of claim 11 and wherein a second milling means forms part of said supply means for comminuting particles suspended in the slurry of the raw material before the latter reaches said sump means.

13. The combination of claim 7 and wherein the wet classification means of said third stage is in the form of a lamina thickener.

14. The combination of claim 13 and wherein said thickener has baffles in a zig-zag arrangement.

15. The combination of claim 7 and wherein said gravitational wet classification means of said second stage is a multi-stage horizontal wet classifier having its stages interconnected in a phalanx arrangement.

16. The combination of claim 7 and wherein a fourth classification stage includes a fourth wet classification means communicating with said liquid cyclone means of said first stage for receiving therefrom slurry with fine particles suspended therein and separated at said first stage and for separating particles in the latter slurry into fine and coarse particles with a slurry having suspended therein the latter coarse particles derived from the fourth stage being combined with the slurry having suspended therein the coarse particles of the third stage to provide the output.

17. The combination of claim 16 and wherein said fourth classification means includes a lamina thickener.

18. The combination of claim 17 and wherein said thickener has baffles in a zig-zag arrangement.

* * * * *